(12) United States Patent
Hao et al.

(10) Patent No.: US 11,758,203 B2
(45) Date of Patent: Sep. 12, 2023

(54) ADAPTIVE BITRATE VIDEO CACHE

(71) Applicants: AT&T Intellectual Property I, L.P., Atlanta, GA (US); University of Southern California, Los Angeles, CA (US)

(72) Inventors: Shuai Hao, Hillsborough, NJ (US); Subhabrata Sen, Westfield, NJ (US); Emir Halepovic, Somerset, NJ (US); Zahaib Akhtar, San Jose, CA (US); Ramesh Govindan, Cerritos, CA (US); Yaguang Li, Sunnyvale, CA (US)

(73) Assignees: AT&T Intellectual Property I, L.P., Atlanta, GA (US); University of Southern California, Los Angeles, CA (US)

( * ) Notice: Subject to any disclaimer, the term of this patent is extended or adjusted under 35 U.S.C. 154(b) by 558 days.

(21) Appl. No.: 16/714,229

(22) Filed: Dec. 13, 2019

(65) Prior Publication Data
US 2021/0185368 A1 Jun. 17, 2021

(51) Int. Cl.
| | |
|---|---|
| *H04N 21/231* | (2011.01) |
| *H04N 21/25* | (2011.01) |
| *H04N 21/845* | (2011.01) |
| *H04N 21/239* | (2011.01) |
| *G06F 12/0871* | (2016.01) |

(Continued)

(52) U.S. Cl.
CPC ... *H04N 21/23106* (2013.01); *H04N 21/2393* (2013.01); *H04N 21/251* (2013.01); *G06F 12/0871* (2013.01); *G06F 2212/602* (2013.01); *G06F 2212/604* (2013.01); *G06F 2212/6028* (2013.01); *H04L 67/568* (2022.05); *H04L 67/62* (2022.05)

(58) Field of Classification Search
None
See application file for complete search history.

(56) References Cited

U.S. PATENT DOCUMENTS

| | | | |
|---|---|---|---|
| 2006/0085601 A1* | 4/2006 | Woffinden | G06F 12/123 711/E12.072 |
| 2012/0159558 A1* | 6/2012 | Whyte | H04N 21/222 725/95 |

(Continued)

OTHER PUBLICATIONS

"AViC: A Cache for Adaptive Birate Video" Akhtar et al., Published Dec. 9-12, 2019 (Year: 2019).*

(Continued)

*Primary Examiner* — Junior O Mendoza
(74) *Attorney, Agent, or Firm* — Nixon Peabody LLP

(57) ABSTRACT

Devices, computer-readable media, and methods for making a cache admission decision regarding a video chunk are described. For instance, a processing system including at least one processor may obtain a request for a first chunk of a first video, determine that the first chunk is not stored in a cache, and apply, in response to the determining that the first chunk is not stored in the cache, a classifier to predict whether the first chunk will be re-requested within a time horizon, where the classifier is trained in accordance with a set of features associated with a plurality of chunks of a plurality of videos. When it is predicted via the classifier that the first chunk will be re-requested within the time horizon, the processing system may store the first chunk in the cache.

20 Claims, 5 Drawing Sheets

(51) Int. Cl.
    *H04L 67/568*     (2022.01)
    *H04L 67/62*      (2022.01)

(56) References Cited

U.S. PATENT DOCUMENTS

2018/0191857 A1* 7/2018 Schooler ........... G06F 16/24568
2019/0089756 A1* 3/2019 Wissingh ......... H04N 21/44209

OTHER PUBLICATIONS

Akhtar, Zahaib & Li, Yaguang & Govindan, Ramesh & Halepovic, Emir & Hao, Shuai & Liu, Yan & Sen, Subhabrata. (2019). AViC: a cache for adaptive bitrate video. pp. 305-317. https://nsl.usc.edu/wp-content/uploads/2019/10/ATTVideoCache.pdf.

OpenCable Specifications, "Adaptive Transport Stream Specification". OC-SP-ATS-I01-140214; Cable Television Laboratories, Inc. 2013-2014. 48 pages. https://docplayer.net/18323643-Opencable-specifications-adaptive-transport-stream-specification-oc-sp-ats-i01-140214-issued-notice.html.

* cited by examiner

ESTIMATE FUNCTION 200

```
1 function Estimate (v, n, t)
    Input: v : the parent video of requested chunk
    Input: n : the index of requested chunk
    Input: t : the current timestamp
    Output: rₙ : the next estimated request for chunk
2 rₙ ← ∞
3 Sᵥ ← v.sessions
4 for j ∈ Sᵥ do
5     m ← j.lastChunk
6     if m < n then
          /* let d be duration of a chunk */
7         est ← t + (n - m) × d
8         if est < rₙ then
9             rₙ ← est
10        end
11    end
12 end
13 if rₙ = ∞ then
       /* the case when no other session will request n
       in future i.e. m > n for all j in Sᵥ */
14    rₙ ← t + v.interArrival + n × d
15 end
16 return rₙ
```

FIG. 2

ADAPTIVE BITRATE VIDEO CACHE

The invention was made with Government support under Contract No. CNS-1413978 awarded by the National Science Foundation. The Government has certain rights to the invention.

The present disclosure relates generally to adaptive video streaming, and more particularly to apparatuses, non-transitory computer-readable media, and methods for making a cache admission decision regarding a video chunk, and to apparatuses, non-transitory computer-readable media, and methods for making a cache eviction determination regarding video chunks in a cache.

BRIEF DESCRIPTION OF THE DRAWINGS

The teachings of the present disclosure can be readily understood by considering the following detailed description in conjunction with the accompanying drawings, in which:

FIG. 2 illustrates an example estimate function for estimating a next request time for a chunk, in accordance with the present disclosure;

To facilitate understanding, identical reference numerals have been used, where possible, to designate identical elements that are common to the figures.

DETAILED DESCRIPTION

Figure 1:
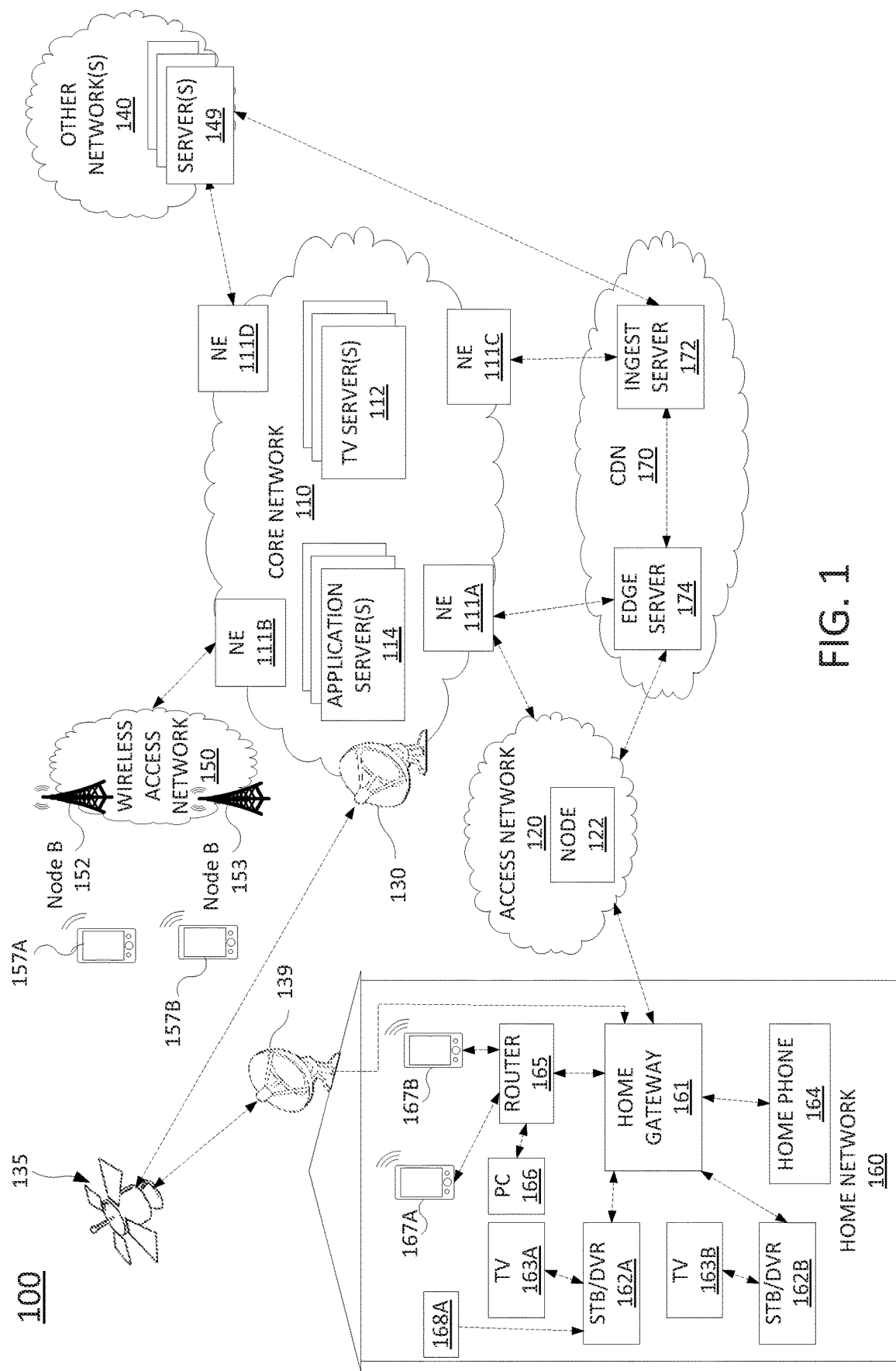
FIG. 1 illustrates an example network related to the present disclosure.

In one example, the present disclosure describes an apparatus, computer-readable medium, and method for making a cache admission decision regarding a video chunk. For instance, a processing system including at least one processor may obtain a request for a first chunk of a first video, determine that the first chunk is not stored in a cache, and apply, in response to the determining that the first chunk is not stored in the cache, a classifier to predict whether the first chunk will be re-requested within a time horizon, where the classifier is trained in accordance with a set of features associated with a plurality of chunks of a plurality of videos. When it is predicted via the classifier that the first chunk will be re-requested within the time horizon, the processing system may store the first chunk in the cache.

In another example, the present disclosure describes an apparatus, computer-readable medium, and method for making a cache eviction determination regarding video chunks in a cache. For instance, a processing system including at least one processor may obtain a first request from a first session for a first chunk of a first video, the first chunk being associated with a first index of the first video, and determine that a second request for a second chunk of the first video is obtained from a second session, the second chunk being associated with a second index of the first video, the second index being prior to the first index in a temporal sequence of indices of the first video, and the second chunk being a chunk of the first video that is last requested via the second session. The processing system may then update a next request estimate for the first chunk in accordance with a difference between the first index and the second index, and further in accordance with a chunk duration of the first video, where the first chunk is stored in a cache that stores a plurality of chunks of a plurality of videos, where the plurality of chunks includes the first chunk. The processing system may further identify at least one chunk of the plurality of chunks having a furthest next request estimate from among a plurality of next request estimates associated with the plurality of chunks and evict the at least one chunk from the cache in accordance with the identifying.

Video delivery technology has shifted from legacy protocols, such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the availability of video in multiple chunks associated with each time block of a video and having different encoding bitrates, with the chunks linked together by a manifest file, or "index file" (also referred to as a "media presentation description" (MPD) in DASH) that defines all of the variants/tracks (e.g., respective sets of chunks, each set at a different bitrate/ encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

For a time block of an adaptive bitrate video, there may be multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/ indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. In one example, a video client running on a mobile device, home television, game console, web browser, etc. may choose which video rate to stream by monitoring network conditions and estimating the available network capacity.

The function of the ABR algorithm is to select ABR variants (called representations in DASH) in real time to maximize video quality and minimize re-buffering events. For example, a video client maintains a media cache (also referred to as a "buffer" or "video buffer"), by pre-fetching video chunks; then playback occurs from the cache. For each time block of a video-on-demand (VoD) program/live channel, the video client selects which variant (chunk) of that time block to download into the buffer. Higher quality chunks for a given time block are larger in size (data volume) and take longer to download than lower quality chunks. In general, the goal is to download as high quality a chunk as possible each time while keeping the buffer from going empty.

Notwithstanding the above, it should be noted that although examples of the present disclosure are illustrated in connection with cache management (e.g., cache admission and cache eviction) with respect to ABR videos, the present disclosure may similarly be applied to cache management for non-ABR videos. For instance, in examples relating to non-ABR videos, a single chunk may be associated with each respective time block of the video, whereas for ABR videos, each time block of the video may have multiple associated chunks, e.g., one from each track/variant.

Video content publishers use CDNs to deliver video-on-demand to end-users. CDNs may comprise a small number of origin servers that store video content and a large number of front-end servers (e.g., edge servers) positioned topologically closer to users. When a client device requests a chunk of video, the CDN redirects it to the nearest front-end server, which, in turn, contacts the origin server for the requested bitrate of the chunk. The front-end server then caches the chunk to serve subsequent requests. This architecture enables the CDN to situate content closer to the end user and reduces response latency. Equally important, front-end servers can serve a significant fraction of requests from the cache, thereby shielding origin servers and reducing the CDN's wide-area bandwidth.

For video streaming, a content delivery network (CDN) may provide better video quality (shorter startup time, less video buffering ratio, etc.) when video data is delivered from CDN edge servers, closer to consuming customers. In theory, a CDN can provision large storage at all edge servers, but this may not be economical. An origin server may host from 10,000 to 100,000 video programs, where each video program may be comprised of from 100,000 to 600,000 component files, or video chunks, based on the video runtime. In comparison, an edge server, or "edge cache," may typically hold far fewer files serving multiple tenants' file delivery purposes, including adaptive bitrate streaming video programs. Some CDNs may manage the finite storage capacity of an edge cache by keeping popular content in the edge cache, evicting less popular titles using a Least Recently Used (LRU) algorithm when the cache is full. LRU is a popular algorithm for the CDN, but may not work best for the content provider. A content provider may have a preferred video it wants to be in the edge cache, such as a pay-per-view (PPV) video, or a high resolution video such as a 4K title. In addition, the preferred titles may not be the popular titles in terms of customer download requests.

Examples of the present disclosure describe an admission control process for a video cache (e.g., at an edge server) that uses a classifier to predict singletons—newly requested chunks that are predicted not to be re-requested within a time horizon. Examples of the present disclosure also describe a cache eviction process that calculates anticipated next request times for chunks in the cache and that evicts the chunk with the furthest anticipated next request time. Using CDN traces from a commercial video service, it has been demonstrated that examples of the present disclosure outperform a range of existing algorithms, including LRU, with respect to byte and object hit ratios, as well as with respect to cache size (e.g., allowing a smaller cache size to achieve a same hit ratio) and network bandwidth utilization.

It is noted that a streaming video session may begin from any location in the video. However, the session generally makes forward progress; once a session requests a chunk k, k<N, of an N-chunk video (e.g., an N-time block video) it is highly likely to request chunk k+1 (e.g., a chunk from the next time block) soon in the future. Earlier algorithms such as LRU and GDSF (Greedy-Dual Size Frequency) may assume that every request is independent of other requests. Notably, this assumption does not hold for video in certain scenarios.

It is also noted that chunk requests are roughly periodic, with average inter-arrival time corresponding to the chunk playback duration. In addition, it is observed via CDN traces (e.g., anonymized HTTP GET requests) of an existing service that a significant number of requests are for singletons: chunks cached upon the first request but never referenced thereafter before being evicted from the cache. In accordance with the present disclosure, singletons are viewed as reducing the efficacy of caching by occupying cache space that more popular objects (e.g., video chunks) could use.

It is further noted that for ABR video streaming, there is a large variability in object (chunk) sizes. For instance, in an example ABR video distribution service, there may be seven encoding levels. Thus, for each video there may be up to seven tracks/variants (or more/less in other examples). With respect to ABR streaming over cellular networks, clients may request a typical range of chunk sizes from 150 KB to about 800 KB (chunks from the highest quality tracks/variants are not requested or are rarely requested). On the other hand, clients streaming via residential broadband may request chunk sizes up to 1800 KB, which is 12 times the smallest chunk size.

Examples of the present disclosure leverage the above observations to provide a cache eviction control process and a cache admission control process. For instance, in one example, the cache eviction process determines estimated next request times for chunks stored in the cache and evicts the chunk (or chunks) with the farthest estimate(s). In one example, the admission control includes a trained classifier (e.g., a binary classifier) that is used to predict whether a newly requested chunk (e.g., one that is not already stored in the cache) is a singleton. For instance, the classifier may output a prediction of whether the chunk is likely to be evicted from the cache before it would next be requested. When a chunk is predicted to be a singleton, the admission control process may decline to store the chunk in the cache.

Chunk size variability—Examples of the present disclosure take object size into account when making admission control and eviction decisions. For instance, it is noted that admitting a large object to the cache may prevent the caching of smaller objects with a potentially higher aggregate hit ratio. Examples of the present disclosure are designed to perform well both by object hit ratio, the fraction of requested objects served from the cache, and byte hit ratio, the fraction of requested bytes served from the cache. With respect to video: an algorithm that sacrifices byte hit ratio for high object hit ratio may result in lower bandwidth savings over the wide area network, while one that sacrifices object hit ratio for higher byte hit ratio may result in a higher fraction of requests reaching the origin server.

Request arrival predictability—For video streaming, client players gradually download successive chunks in a video. These players may use playback buffers which limit advanced buffering to a few tens of seconds of video. Once the playback buffer is full, a player may make another request only when space becomes available in the buffer. In this regard, it is assumed that if most clients watch videos at the normal playback rate (instead of, for example, fast forwarding or rewinding), the average request inter-arrival time is roughly the duration of a chunk. More precisely, it should be slightly smaller than the chunk duration, because the player anticipates buffer availability and issues the next request before the playback completes. Actual observations of a video delivery service support these assumptions. For example, it is found that almost 89% of requests via cellular streaming sessions and 79% of requests via residential broadband streaming sessions arrive within 4 seconds, which is the chunk duration used by the observed video delivery service. Furthermore, it is observed that the tail of all distributions stretches out beyond 10 seconds, which may be due to stalls, paused playbacks or players releasing more than one chunk from the buffer before re-filling. The mean inter-arrival time for requests for a next chunk via a given session is slightly over 3 seconds for both cellular and residential broadband-based video streaming.

Prevalence of singletons—it has been observed that for cellular clients over a 12 hour period, more than half of all requests are for chunks not referenced again within that time interval. For residential clients, it has been observed that 36% of requests over a 12 hour period are for chunks which were not referenced again. Similarly, within a 24 hour interval, it has been observed that 43% of cellular and 29% of residential requests are for chunks which are only referenced once. A singleton can pollute a cache by excluding more popular objects from the cache. Size variability exacerbates the problem: large singletons can exclude several smaller objects from the cache, thereby adversely affecting both object and byte hit ratios.

Singletons can occur because the corresponding chunk belongs to a highly unpopular video. However, as a further example, it has been observed that among residential clients, up to 18% of singletons are from videos which have at least 10 sessions over a 12 hour period. In this regard, it is noted that for requests from residential broadband clients, bitrate 6 is the most preferred bitrate, accounting for 60% of all requests, with other bitrates accounting for smaller fractions of requests (and hence resulting in many singletons). Similarly, almost 65% of requests from cellular network-based clients accessed bitrate 3, with few requests for bitrates 1, 5 and 6, likely resulting in singletons.

Admission control—Based on the prevalence of singletons, the admission control process of the present disclosure aims to prevent singletons from polluting the cache. In one example, admission control involves a binary determination of whether a chunk is a singleton or not. In one example, the present disclosure utilizes chunk request data (e.g., two week records) to train a machine learning classifier (e.g., a binary classifier). In addition, the classifier may be retrained daily, or according to another schedule, such as every 12 hours, every 48 hours, etc. To illustrate, in one example, the present disclosure trains a Gradient Boosted Decision Tree (GBDT) classifier to output a probability estimate for a future reference of a chunk within a selected time horizon. In one example, the present disclosure applies a threshold $\tau$ to this probability to determine whether to admit or deny the chunk (e.g., deny the chunk if the prediction of the chunk being a singleton is with greater than 60% confidence, greater than 70% confidence, etc., rather than say 51%). Notably, GBDT is fast: training a single model may take less than 10 minutes on a dataset comprising 100 M requests. The size of the resultant model is also small, with an average size of 175.86 KB. In addition, GBDTs (and most decision tree-based classifiers) are generally more interpretable than various deep learning techniques, and are quick to query and scale well with requests.

It should be noted that feature selection and the selected time horizon may affect the performance of the admission control. In accordance with the present disclosure, time horizons may depend upon cache size. For instance, an object o may be a singleton with respect to a 32 GB cache but may not be a singleton with respect to a 64 GB cache (the latter holds more objects, so the next request for o may arrive before o would be evicted according to an eviction process). Thus, in one example, the classifier is trained differently for different cache sizes. In one example, the time horizon is selected as the time to completely replace the contents of a cache using a first-in-first-out (FIFO) policy.

For each cache size, the time horizon may be estimated by simulating a trace through a cache of the corresponding size using a FIFO eviction policy. After estimating the time horizon T, the present disclosure may generate training samples (e.g., labeled data) from traces by marking as a singleton any chunk request whose next request is more than time T in the future. Examples of the present disclosure may utilize several features of chunk request data in connection with training the classifier (e.g., a GBDT). For instance, features may include: the day of the week, the time of the day (e.g., the hour of the day in 24 hour format), the chunk size (e.g., in bytes or bits), the chunk index (e.g., the index of the chunk in the video, which may indicate the time block of the video associated with the chunk), the chunk bitrate (e.g., the track/variant of the chunk, and/or the actual bitrate of the chunk), the total number of video sessions, the average number of video sessions within 24 hours (e.g., 24 hours prior to a given request for a chunk, 24 hours centered on the time of the given request, etc.), the session inter-arrival time for the video to which a given chunk belongs (e.g., the average time between starts of new sessions for the video), the time since a start of a last session for the same video relating to a given chunk request, and so forth.

It is observed that the more important features for classification accuracy are the number of sessions for a video (e.g., in the last 24 hours), the session inter-arrival time, and the bitrate/track. Features of relatively less importance include the gap between the current time and the start of the last session for the video, the chunk size, and the time of day. The relatively least important features (but still relevant) include the total number of sessions for the video (since inception of the tracking of such a metric), the chunk index of a chunk, and the day of the week. However, it should also be noted that the foregoing examples of classifier features are just one set of possible features that may be associated with a classifier in accordance with the present disclosure. For instance, in other, further, and different examples, some of the above features may be omitted, may be replaced with different features, may be supplemented with additional features, and so forth.

In any case, having trained the classifier (e.g., a GBDT) with labeled training data with respect to such features, the classifier may be applied in accordance with the admission control process to new requests for chunks that are not already in the cache. If it is predicted via the classifier that the chunk is a singleton (e.g., the chunk is sufficiently likely to not be requested within the time horizon), the admission control process may deny admission of the chunk to the cache. Otherwise, the new chunk may be admitted to the cache.

Eviction process—As noted above, the eviction process of the present disclosure may include evicting the chunk stored in the cache with the farthest next request estimate (e.g., the furthest/latest predicted time of the next request for the chunk). To support such calculations, the present disclosure may maintain information associated with a video, including cached chunks of the video and ongoing sessions. To illustrate, in one example, if the requested chunk belongs to a video v that has no other chunk currently cached, a new video record Rv may be created for v. In one example, Rv stores information about ongoing video sessions by maintaining a map of session records. In one example, each session record may contain a session identifier (sessionID) (e.g., a 32 byte string), the last chunk requested by the session and the timestamp at which the chunk was requested. In addition to session records, Rv may also contains v's mean session inter-arrival time. In one example, the present disclosure maintains chunk metadata (e.g., next request estimate, chunk ID) in sorted order by using a max-heap data structure keyed on the request estimate. This meta-data may be inserted into the max-heap when the chunk is first requested and may then be maintained as long as the chunk exists in the cache.

FIG. 2 illustrates an example estimate function 200 (e.g., pseudocode) for estimating a next request time for a chunk. In connection with the example of FIG. 2, suppose that a request arrives for the n-th chunk of video v on some session i. Let $S_v$ denote the set of all ongoing sessions for v. The estimate function 200 may find that session from $S_v$ which will next request the n-th chunk. This session may be denoted by j, and the last chunk requested by j be the m-th chunk. The estimate function 200 may then calculate the next request estimate $r_n$ for the n-th chunk in accordance with Equation 1, where m<n, t is the current time (at which the m-th chunk request arrived), and d is the chunk duration:

$$r_n = t + (n-m)d \qquad \text{Equation 1:}$$

This leverages the predictability of request arrivals, and estimates the next arrival for n to be n−m chunk durations in the future. However, the estimate function 200 also considers the case when the search through $S_v$ yields no existing session likely to request chunk n in the future. This may happen when m>n for all ongoing sessions. In this case, the request for n must come from a new session (where it is assumed that rewinds and fast-forwards are rare, and thus are not taken into account in the estimation). In one example, when no existing session is found having m<n, the next request estimate may be in accordance with Equation 2, where the average session inter-arrival time for v is I:

$$r_n = t + I + nd \qquad \text{Equation 2:}$$

Thus, in accordance with Equation 2, the estimate $r_n$ is offset by the time it would take for a new session for v to arrive and the time to proceed through the video to the index n-th chunk.

A request for any chunk in a video can cause the next request estimates of all other chunks in the video to change. In one example, the present disclosure re-computes next request estimates for all chunks in a video in response to a request for any chunk in the video. In one example, this is achieved via an "update" function. When a request arrives for a chunk of video v, and regardless of whether the request results in a cache hit or miss, the update function extracts the metadata of all chunks of video v (e.g., by scanning the max-heap), then calls an estimate function (e.g., estimate function 200 of FIG. 2) for each chunk, obtains the updated request estimate for the corresponding chunk, and updates the metadata associated with the corresponding chunk.

Videos whose sessions were active in the recent past, but have since become idle, can have stale next request estimates for their chunks. Furthermore, metadata for these chunks may be situated deep in the max-heap by virtue of next request estimates for chunks of the video that were acquired while the video was popular, and thus are unlikely to be evicted. This may result in cache poisoning which can adversely impact cache efficacy. To address this, in one example, the present disclosure also maintains video records in a least recently used (LRU) list. The LRU list may be used to quickly find out which videos have not had a recent session. In one example, on each request for a chunk of any video, the present disclosure may identify the least recently used video via the LRU list, and may perform an "update" for each of the next request estimates of its chunks (in addition to updating chunks belonging to the video of the requested chunk). This ensures that chunks of stale videos will eventually have their next request estimates recomputed.

The foregoing describes cache eviction which may assume a single bitrate per video (e.g., non-ABR video). To address ABR videos, and more specifically, cache eviction for chunks of ABR videos, the foregoing may be extended as follows. In one example, when a chunk request for the m-th chunk arrives, the present disclosure may estimate, for each chunk index i in the video, a request estimate for every bitrate b corresponding to that estimate.

In one example, the present disclosure uses the relative popularity of the bitrates to weight the estimates, based on the idea that less popular bitrates should have a next request estimate farther in the future than more popular ones. For instance, the present disclosure may inflate the next request estimate for a chunk based upon the relative popularity of the bitrate of the chunk. To illustrate, suppose an ABR video has just two variants, or bitrates: a standard definition (SD) bitrate and a high definition (HD) bitrate. Further, assume that clients are 4 times as likely to prefer the HD bitrate to the SD bitrate. Then, to calculate the request estimate for an SD chunk, the present disclosure may generate an initial estimate, e.g., in accordance with Equation 1 or Equation 2, and then inflate the estimate for the SD bitrate by 4 times.

To further illustrate, if a video uses k bitrates $b_1 \ldots b_k$. Let $w_j, j \in 1 \ldots k$ be the ratio of the number of accesses to chunks with bitrate $b_j$ to chunks with bitrate $b_i$ where $b_i$ is the most frequently accessed bitrate. Then, the present disclosure may adapt Equation 1 as follows to compute the next request estimate for chunk n encoded using bitrate $b_j$:

$$r_{n_{b_j}} = t + \frac{(n-m)d}{w_j} \quad \text{Equation 3}$$

It is noted that Equation 2 may be similarly adapted to weight the next request estimate according to the relative popularity of the track, variant, and/or encoding bitrate of the subject chunk.

The above described eviction process may be further extended by expediting the search for possible sessions that may next request a chunk. For example, consider the scenario where a video v contains 30 chunks. The video has three ongoing sessions A, B and C. Assume that A last requested chunk 3, B requested chunk 8 and C last requested chunk 27. When a request for chunk 9 arrives from B the only session that is likely to request chunk 9 again in the future is A (assuming A is unlikely to fast forward, and C unlikely to rewind the video). To narrow the search space of candidate sessions, in one example, the present disclosure uses a nested hashmap (hashmap of hashmap) data structure to store session records. The outer hashmap uses a bucket of chunk indices as keys. Each bucket then maps to another hashmap which maps a chunk index in the bucket to a list of sessions which last requested the chunk. Using a bucket size of 5 for the outer hashmap, then in the example above, video v has a total of 6 buckets (30 chunks divided by 5) and each of these buckets maps to another hashmap with a maximum size of 5 (5 chunks in each bucket). Accordingly, A is hashed to bucket 0 in the outer hashmap and then in the nested hashmap the chunk last requested by A (chunk 3) stores A's session record. Similarly, B maps to bucket 1 in the outer hashmap and C to bucket 5. When a request for chunk 9 arrives from B, the present disclosure may start searching from bucket 1 and move backwards, searching until any other session that is going to request chunk 9 in the future is found. This results in a constant order 1 (O1) time search complexity, because after indexing into the outer hashmap, the search space is restricted to the size of bucket. Thus, using a bucket size of 25 chunks, a total of 432 buckets may be used for a 3-hour video with 4-second chunks.

In one example, the "update" function may not update every chunk of a video. Instead, for a given video, it may only update that chunk with the farthest next request estimate. As long as this chunk's next request estimate is accurate, the present disclosure can make eviction decisions. However, searching for this local farthest next request estimate for a chunk is expensive using a single max-heap. To expedite the look-up, the present disclosure may organize the chunk metadata for the cache as a hierarchy of local max-heaps and a global heap. For instance, there may be one local heap for each video, which contains its chunks sorted according to the next request estimates. The global max-heap has pointers to the root nodes of all the local video-specific heaps. Then, finding the chunk in a video with the farthest next request estimate is a single heap lookup. Similarly, in one example, the present disclosure may also update the next request estimate for only the farthest chunk of the least recently used video.

In addition, with this design, to evict a chunk, the present disclosure may first consult the global heap to find the video which holds the chunk with the farthest next reference. Let $c_f$ denote this chunk and assume that video v holds $c_f$. The present disclosure may then remove the metadata associated with $c_f$ from v's local heap. After removing the chunk, if v's local heap is non-empty, v's node in the global heap may be updated with the new root of the local heap. Then, $c_f$ may be evicted from the cache. Thus, in one example, these steps require three heap operations. Similarly, in one example, the present disclosure may also update the next request estimate for only the farthest chunk of the least recently used video.

In addition to fast look-ups, the nested max-heap data structure also reduces memory usage. For example, as compared to GDSF, GDSF uses a single heap to track all chunks in the cache. The size of this single heap is much larger than the smaller heaps which result due to the hierarchical/nested max-heap used in examples of the present disclosure. As a result, GDSF's single heap grows by larger amounts (in absolute terms) than the nested heaps, which are individually resized at runtime.

Both the eviction and admission control processes use historical information associated with videos. For instance, as noted above, the eviction process may order chunks by their next request estimates. To compute these estimates, Equation 2 uses the inter-arrival time of sessions for a video. Likewise, for admission control, the present disclosure assembles a set of features on each chunk request as classifier inputs. These features are video-specific. In one example, the present disclosure may maintain state for every video. However, this can result in a high memory footprint. To reduce memory footprint, in one example, the present disclosure does not maintain accurate state for every video. For instance, consider a video v which has inter-arrival time of I between successive sessions, and further suppose that I is significantly large, e.g., >24 hours. In this case, if chunks of v are cached, these chunks would likely be evicted much earlier than I—the interval after which another session for v arrives. In other words, chunks of v will be singletons. For such unpopular videos, maintaining accurate estimates of session inter-arrival times does not contribute towards improving performance.

Instead of maintaining state for all videos, in one example, the present disclosure may maintain historical state for the N most recently requested videos. In one example, video records may be maintained in two separate LRU lists: an active list which keeps track of the videos currently in the cache, and an inactive list which keeps track of videos requested recently but which are no longer active (e.g., no longer having any chunks in the cache). When a video v is removed from the active list it is moved to the inactive list but the state is preserved. If a session for v arrives while the video in the inactive list, the video v is moved back to the active list. If no further sessions arrive while a video is in the inactive list, the video may eventually be removed and the state information lost. For instance, state may be maintained for N=5000 videos, which may provide for high performance while keeping the memory footprint comparable to other algorithms. It is noted that storing state of videos in the inactive list may also be used for admission control, as well as for computing the session inter-arrival times for videos, which may then be used in computing next request estimates.

It has been demonstrated that especially at lower cache sizes, the mechanism to prevent stale estimates by updating the least recently used video contributes the most performance gains (e.g., over 10% gains at cache sizes up to 512 GB), since stale videos can potentially cause poisoning of the cache, limiting its performance over the long run. Weighting requests estimates by bitrate popularity, and admission control, each improve performance by a few percentage points. The hit-rate improvement due to admission control is relatively higher for smaller sized caches because the effectiveness of admission control is proportional to the percentage of requests which act as singletons in a given request workload. Smaller caches have a smaller time horizon causing a larger percentage of requests to act as singletons in a given workload, allowing greater gains via the admission control process of the present disclosure as compared to larger caches.

It should also be noted that although examples of the present disclosure are described primarily in connection with a video client and video streaming, examples of the present disclosure may be similarly applied to other types of streaming media, such as adaptive bitrate streaming audio (either as a standalone application or for audio tracks in parallel with video tracks of a video). Similarly, aspects of the present disclosure are equally applicable to streaming via cellular networks, other wired or wireless networks (e.g., home broadband), and so forth. These and other aspects of the present disclosure are described in greater detail below in connection with the examples of FIGS. 1-5.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by the same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of the mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

In one example, application servers 114 may include data storage servers to receive and store manifest files regarding chunk-based multi-encoded videos (e.g., ABR or non-ABR videos), maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of chunk-based multi-encoded videos (e.g., AVR videos). In one example, each of the servers 149 may also make available manifest files which describe the variants of a video and/or the segments/video chunks thereof which are stored on the respective one of the servers 149. For instance, there may be several video chunks containing video and audio for the same time block (e.g., a portion of 2-10 seconds) of the video, but which are encoded at different bitrates in accordance with an adaptive bitrate streaming protocol. Thus, a streaming video player (e.g., an ABR streaming video player) may request and obtain any one of the different video chunks for the time block, e.g., depending upon a state of a video buffer, depending upon network bandwidth or other network conditions, depending upon the access rights of the streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a streaming video player (e.g., an ABR video player) capable of streaming and playing ABR and/or non-ABR videos in formats such as H.264 (Advanced Video Coding (AVC)), H.265 (High Efficiency Video Coding (HEVC)), Moving Picture Expert Group (MPEG) .mpeg files, .mov files, .mp4 files, .3gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices. It should be noted that in one example, one or more of mobile devices 157A, 157B, 167A, and 167B, TV 163A, TV 163B, and/or PC 166 may also comprise a streaming video player (e.g., an ABR video player).

Figure 3:
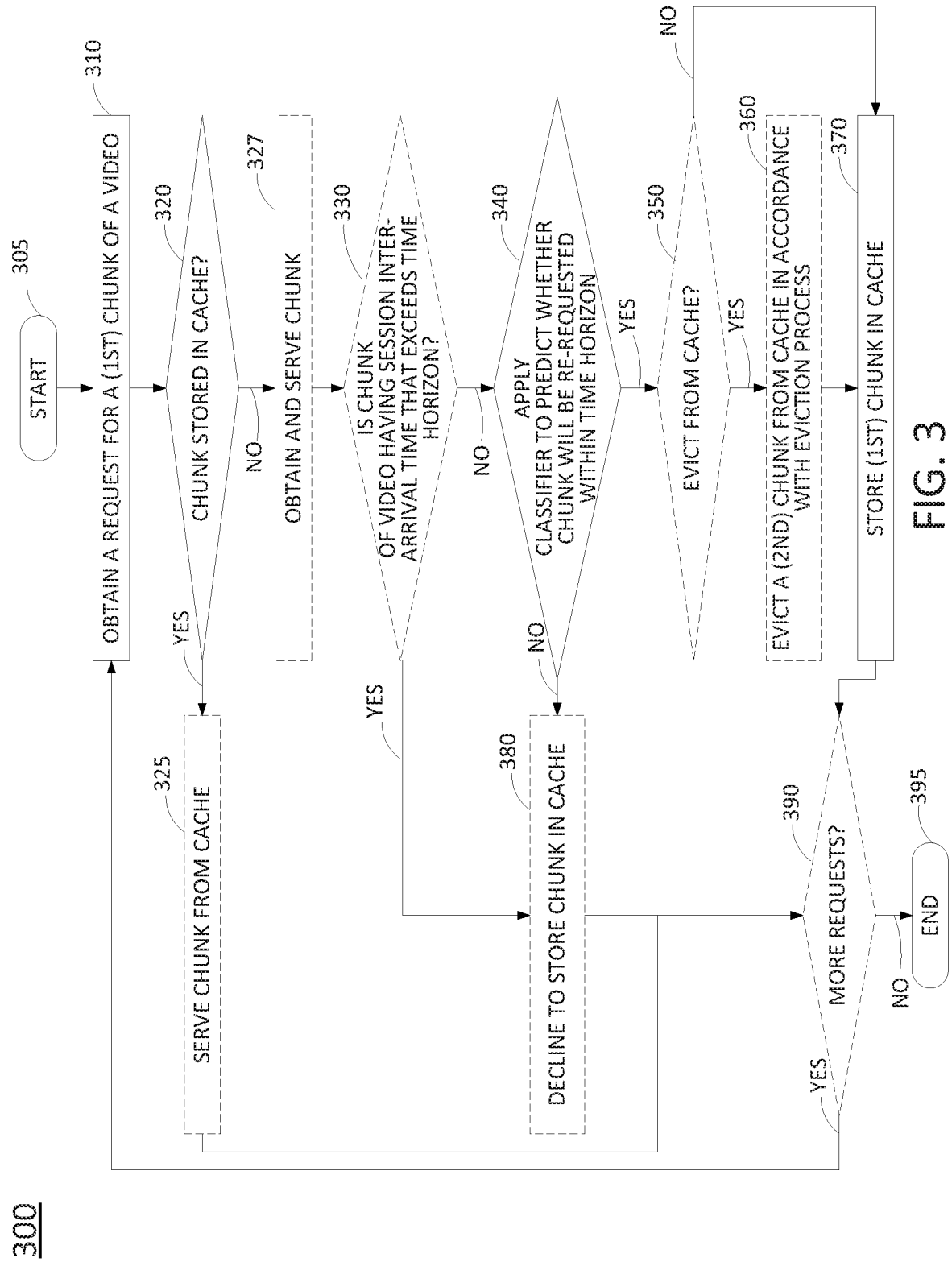
FIG. 3 illustrates a flowchart of an example method for a cache admission decision regarding a video chunk.
Figure 4:
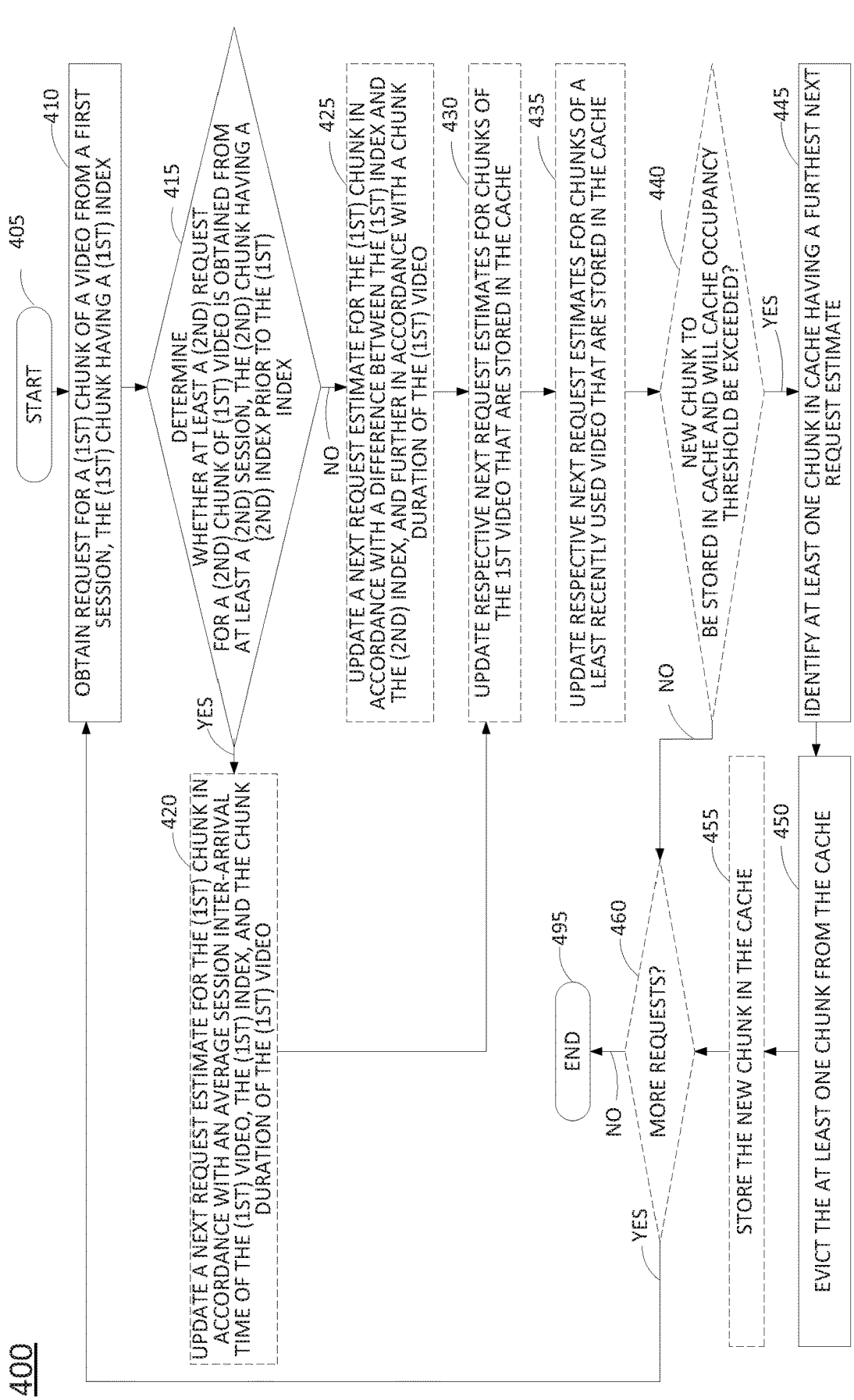
FIG. 4 illustrates a flowchart of an example method for a cache eviction determination regarding video chunks in a cache.

Network 100 may also include a content distribution network (CDN) 170. In one example, CDN 170 may be operated by a different entity from the core network 110. In another example, CDN 170 may be operated by the same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or processing system, such as computing system 500, and/or hardware processor element 502 as described in connection with FIG. 5 below, specifically configured to perform various steps, functions, and/or operations for making a cache admission decision regarding a video chunk and/or for making a cache eviction determination regarding video chunks in a cache, as described herein. For instance, an example method 300 for making a cache admission decision regarding a video chunk is illustrated in FIG. 3 and described in greater detail below. In addition, an example method 400 for making a cache eviction determination regarding video chunks in a cache is illustrated in FIG. 4 and described in greater detail below.

Figure 5:
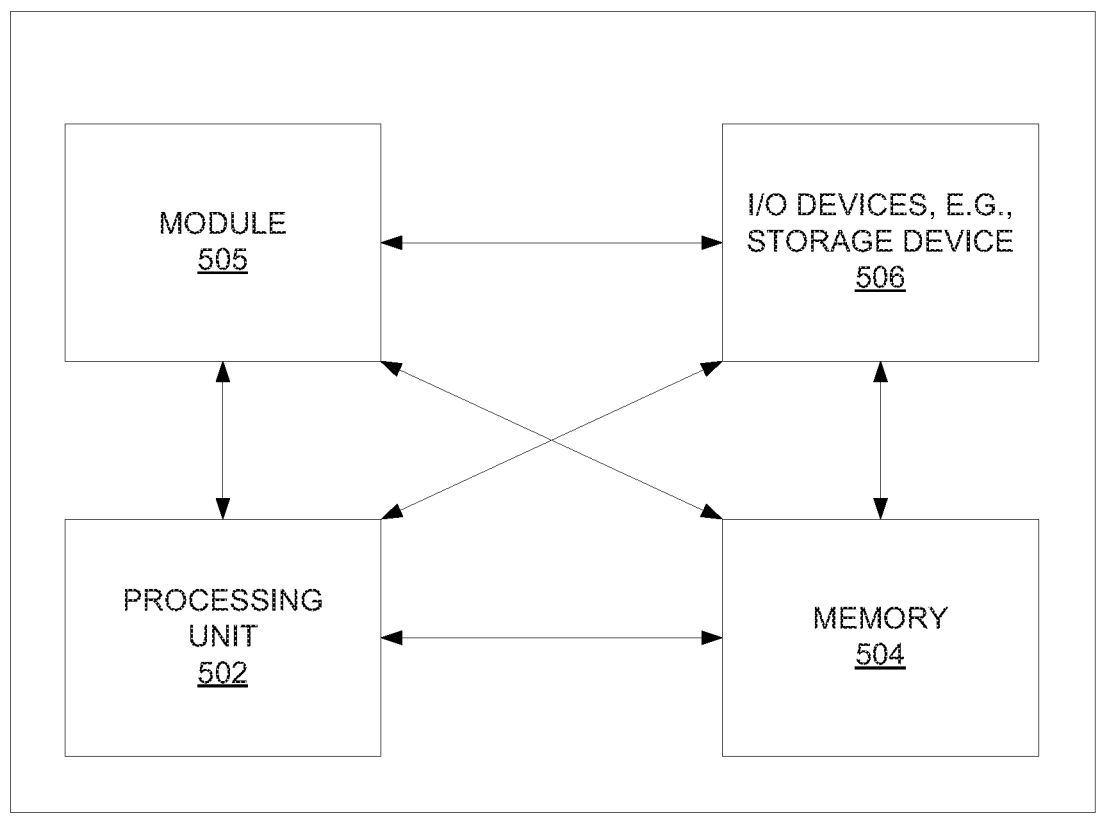
FIG. 5 illustrates a high level block diagram of a computing device or system specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of computing device or processing system, such as computing system 500, and/or hardware processor element 502 as described in connection with FIG. 5 below, specifically configured to perform various steps, functions, and/or operations in connection with examples of the present disclosure for making a cache admission decision regarding a video chunk and/or for making a cache eviction determination regarding video chunks in a cache. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client/video player for requesting and receiving a manifest file for video, as described herein. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file and in accordance with player streaming logic.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from the origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks at the edge server 174 (e.g., in accordance with the example method 300 of FIG. 3 and/or as described elsewhere herein), may serve future requests from the edge server (if requested chunks are stored therein), may evict any chunks that are stored at the edge server 174 (e.g., in accordance with the example method 400 of FIG. 4 and/or as described elsewhere herein), and so forth.

It should be noted that a similar process may involve other devices, such as TV 163A or TV 163B (e.g., "smart" TVs), mobile devices 176A, 167B, 157A, or 157B, or the like obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

It should also be noted that in accordance with the present disclosure, any one or more devices of network 100 may perform operations for generating different video chunks/bitrate variants for time blocks of a video and/or for generating different tracks of a video (e.g., ABR encoders or the like), for generating a manifest file for the video, and so on, such as one or more of application servers 114, TV servers 112, ingest server 172, edge server 174, one or more of servers 149, and so forth. For instance, any one or more of such devices may comprise a processing system to create, store, and/or stream video chunks for variants of ABR videos (or non-ABR/single bitrate/single encoding level videos), as well as to perform other functions.

In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 3 illustrates a flowchart of a method 300 for making a cache admission decision regarding a video chunk, in accordance with the present disclosure. In one example, the method 300 is performed by a device or processing system that provides caching of videos (or portions thereof) for video streaming. For instance, the method 300 may be performed by one or more devices as illustrated in FIG. 1, such as edge server 174, ingest server 172, one of TV servers 112, or the like, or any one or more components thereof, or by one or more of these devices in conjunction with one another and/or in conjunction with other devices and/or components of network 100 of FIG. 1, e.g., one or more client devices, such as one of STB/DVR 162A, STB/DVR 162B, one or more of mobile devices 157A, 157B, 167A, and 167B, TV 163A, TV 163B, and/or PC 166, and so forth. In one example, the steps, functions, or operations of method 300 may be performed by a computing device or processing system, such as computing system 500 and/or hardware processor element 502 as described in connection with FIG. 5 below. For instance, the computing system 500 may represent any one or more components of the network 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and proceeds to step 310.

At step 310, the processing system obtains a request for a first chunk of a first video. For example, the request may be received from a client device/video player for streaming of the first video. For instance, the processing system may comprise a cache (e.g., a video cache) for a video streaming service. In one example, the video player/client device may be an ABR streaming video player and the processing system may comprise a cache for ABR video streaming. In one example, the processing system may be a CDN edge server or "edge cache." In one example, the edge server may be dedicated to video streaming (e.g., the edge server does not cache other types of content). As such, in one example the first video may comprise an ABR video, and the first chunk may be one of a plurality of chunks associated with a time block, or time interval, of the first video, where each of the plurality of chunks associated with the time interval has a different encoding bitrate. In one example, the request may be indicated by an HTTP GET message, or the like, wherein a URL, header field, and/or message body may indicate the first chunk of the first video that is being requested. In one example, the video player/client device may submit the request in accordance with information regarding the first video, the tracks/variants and/or the chunks thereof, and so forth as contained in a manifest file for the first video.

It should also be noted that although the terms, "first," "second," "third," etc., may be used herein, the use of these terms is intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a time interval, a chunk, a segment, a frame, etc. necessarily relates to a beginning of the video (although in one example it may so relate).

At step 320, the processing system determines that the first chunk is not stored in the cache. If it is determined that the first chunk is stored in the cache, the method 300 may proceed to optional step 325. Otherwise the method 300 may proceed to optional step 327.

At optional step 325, the processing system may serve the first chunk from the cache, e.g., to the client device/video player that requested the first chunk.

At optional step 327, the processing system may obtain and serve the first chunk. For instance, the processing system may comprise an edge server and may request the first chunk from a CDN ingest server, a mid-tier server, an origin server, etc. Similarly, the processing system may comprise a mid-tier server that may request the first chunk from an ingest server, an origin server, etc. Upon obtaining the first chunk, the processing system may then forward the first chunk to the client device/video player that requested the first chunk. Following optional step 327, the method 300 may proceed to optional step 330.

At optional step 330, the processing system may determine whether a session inter-arrival time for the first video exceeds a threshold, e.g., 12 hours, 24 hours, 36 hours, etc. For example, those videos which may only be requested no more than once per day at the cache are highly likely to have chunks which are all singletons. Accordingly, in one example, optional step 330 may provide a first-stage screening to determine whether the first chunk is from a sufficiently unpopular video and should not be cached. The threshold may depend upon various considerations, such as the total storage size/volume of the cache, etc. If it is determined at step 330 that the session inter-arrival time exceeds the threshold, the method 300 may proceed to optional step 380. Otherwise, when it is determined that the session inter-arrival time is less than the threshold, the method 300 may proceed to step 340.

At step 340, the processing system applies (e.g., in response to determining that the first chunk is not stored in the cache) a classifier (e.g., a binary classifier, a GBDT, etc.) to determine whether to store the first chunk in the cache. In one example, the classifier is trained in accordance with a set of features associated with a plurality of chunks of a plurality of videos. For instance, the classifier may be for predicting whether a requested chunk will be re-requested within a time horizon. The time horizon may be based upon a size of the cache. For instance, the time horizon may comprise an estimate of a time to replace contents of the cache at a full capacity in accordance with a first-in-first-out (FIFO) policy. The set of features may comprise: a chunk size, a chunk index (e.g., indicative of the time interval or temporal position of the (first) chunk in the (first) video), a chunk bitrate, a number of sessions for streaming the (first) video, an average number of sessions for streaming the (first) video within a given time period (e.g., 12 hours, 24 hours, etc.), a session inter-arrival time for the (first) video, a time since a start of a last session for streaming the (first) video, a time of day, a day of the week, and so forth.

When it is predicted via the classifier that the first chunk will be re-requested within the time horizon, the processing system may therefore select to store the first chunk in the cache. Accordingly, the method 300 may proceed to optional step 350 or to step 370. Otherwise, the method 300 may proceed to optional step 380. It should also be noted that in one example, the classifier outputs a probability estimate for a future request for the first chunk within the time horizon (and/or for the first chunk being a "singleton"). In addition, in one example, step 340 may further include applying a threshold to the probability estimate to determine whether to admit the first chunk to the cache. In other words, it may be selected to store the first chunk in the cache when the probability estimate complies with a threshold (e.g., does not exceed the threshold). For instance, a more permissive cache admittance policy may utilize a 60% or greater probability threshold, 70% or greater probability threshold, etc. of the chunk being a singleton (rather than a 51% probability threshold, for example) to deny admittance to the cache. However, if the probability estimate of the chunk being a singleton does not exceed the threshold (e.g., the probability estimate complies with the threshold), the corresponding action may be to admit the chunk to the cache. On the other hand, a more restrictive cache admittance policy may utilize a 40% probability threshold, a 45% probability threshold, etc. of the chunk being a singleton to deny admittance to the cache. It should be noted that the threshold may comprise a positive or negative threshold, (e.g., a floor or a ceiling) depending upon whether the probability estimate is characterized as a "negative metric," such as a likelihood of a chunk being a singleton, or "positive" metric, such as a likelihood that the chunk will be re-requested within the time horizon. Thus, in an example where the probability estimate is a probability of the first chunk will be re-requested within the time horizon, the threshold may be 60 percent, and "compliance" with the threshold may mean that the probability estimate exceeds and/or is at least 60 percent.

At optional step 380, the processing system may decline to store the (first) chunk in the cache. The method 300 may then proceed to optional step 390. On the other hand, when it is predicted via the classifier that the first chunk will be re-requested within the time horizon, the processing system may therefore select to store the first chunk in the cache. In one example, the method 300 may first proceed to optional step 350.

At optional step 350, the processing system may determine whether one or more chunks are to be evicted from the cache. For instance, optional step 350 may include determining, in response to selecting to store the first chunk in the cache, whether a storage of the first chunk in the cache will cause the cache to exceed an occupancy threshold. In response to determining that no chunks are to be evicted from the cache, the method 300 may proceed to optional step 370. Otherwise, when it is determined that one or more chunks are to be evicted from the cache, the method 300 may proceed to optional step 360.

At optional step 360, the processing system may evict at least a second chunk from the cache in accordance with an eviction process. As noted above, the evicting at least the second chunk may be performed in response to determining that the storage of the first chunk in the cache will cause the cache to exceed the occupancy threshold. In one example, the eviction process of optional step 360 may include identifying the second chunk as having a longest next request estimate as compared to next request estimates of a plurality of chunks (e.g., of at least one video including at least the first video) stored in the cache. In one example, (e.g., for examples in which one or more of the videos having chunks in the cache are ABR videos), for a given chunk of the plurality of chunks stored in the cache, the eviction policy may weight a next request estimate for the given chunk in accordance with a relative popularity of a track of the given chunk as compared to other tracks for a same video to which the given chunk belongs. In any case, the processing system may evict at least the second chunk from the cache when it is determined that the second chunk has the longest next request estimate (and similarly for additional chunks, where more than one chunk may be evicted to accommodate adding the first chunk to the cache). In one example, the eviction process may be in accordance with the method 400 of FIG. 4, described in greater detail below. Following optional step 360, the method 300 may proceed to optional step 370.

At step 370, the processing system stores the first chunk in the cache, e.g., in response to the prediction obtained at step 340 indicating that the chunk will be re-requested within the time horizon. Following optional step 370, the method 300 may proceed to optional step 390.

At optional step 390, the processing system may determine if there are more chunk requests to process. If there are no more chunk requests to process, the method 300 may proceed to step 395. Otherwise, if there are more chunk requests to process, the method 300 may return to step 310 to process one or more additional chunks. For instance, with respect to an additional iteration of the method 300, the processing system may obtain a request for a second chunk (e.g., at step 310) determine that the second chunk is not stored in the cache (e.g., at optional step 320), determine that a session inter-arrival time of the second video exceeds the threshold (e.g., at optional step 330), and determine to not store the second chunk in the cache (e.g., at optional step 380), in response to determining that the session inter-arrival time of the second video exceeds the threshold. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as for additional time intervals and/or chunks of the first video or for a different video, and so forth. Thus, these and other modifications are all contemplated within the scope of the present disclosure.

FIG. 4 illustrates a flowchart of a method 400 for making a cache eviction determination regarding video chunks in a cache, in accordance with the present disclosure. In one example, the method 400 is performed by a device or processing system that provides caching of videos (or portions thereof) for video streaming. For instance, the method 400 may be performed by one or more devices as illustrated in FIG. 1, such as edge server 174, ingest server 172, one of TV servers 112, or the like, or any one or more components thereof, or by one or more of these devices in conjunction with one another and/or in conjunction with other devices and/or components of network 100 of FIG. 1, e.g., one or more client devices, such as one of STB/DVR 162A, STB/DVR 162B, TV 163A, TV 163B, one or more of mobile devices 157A, 157B, 167A, and 167B, and/or PC 166, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the network 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system may obtain a first request from a first session for a first chunk of a first video, where the first chunk is associated with a first index of the first video. As noted above, although designations of "first" may be used herein, the term "first" is used simply as a label and does not imply that a time interval, a chunk, a segment, a frame, etc. necessarily relates to a beginning of the video, the initial time interval, chunk, segment, or frame of a video, etc. (although in one example it could be). Similarly, a "first" session does not necessarily denote that the "first" session was commenced before the start of a "second" session, and so forth. In one example, the first index indicates a corresponding time interval, or time block, of the first video to which the first chunk belongs. In one example, the first session may be for a first client device/video player for streaming of the first video.

In one example, the processing system may comprise a cache (e.g., a video cache) for a video streaming service. In one example, the video player/client device may be an ABR streaming video player and the processing system may comprise a cache for ABR video streaming. In one example, the processing system may be a CDN edge server. In one example, the edge server may be dedicated to video streaming (e.g., the edge server does not cache other types of content). As such, in one example the first video may comprise an ABR video, and the first chunk may be one of a plurality of chunks associated with a time interval of the first video, where each of the plurality of chunks associated with the time interval has a different encoding bitrate. In one example, the request may be indicated by an HTTP GET message, or the like, wherein a URL, header field, and/or message body may indicate the first chunk of the first video that is being requested. In one example, the video player/client device may submit the request in accordance with information regarding the first video, the tracks/variants and/or the chunks thereof, and so forth as contained in a manifest file for the first video.

At step 415, the processing system determines whether there is a second request for a second chunk of the first video is obtained from a second session, the second chunk having a second index, the second index being prior to the first index in a temporal sequence of indices of the first video, the second chunk being a chunk of the first video that is last requested via the second session. For instance, the second index may be a closest index to the first index from among indices of respective chunks of the first video that are last requested via a plurality of sessions and that are prior to the first index in the temporal sequence of indices of the first video.

In one example, the processing system stores session records of the first video in a nested hashmap (and likewise for other videos, and the other sessions of the other videos), where an outer hashmap of the nested hashmap uses a bucket of chunk indices as keys, where each bucket of the outer hashmap maps to a respective inner hashmap of a plurality of inner hashmaps, and each respective inner hashmap maps a chunk index in the bucket to a list of sessions which last requested a chunk identified by the chunk index. In such an example, the second index may be determined to be the closest (prior) index in accordance with a search via the nested hashmap.

If and when it is determined that none of the respective chunks of the first video that are last requested via the plurality of sessions has an index that is prior to the first index in the temporal sequence of indices of the first video, the method 400 may proceed to optional step 420. Otherwise, when (at least) the second request is identified, the method may proceed to step 425.

At optional step 420, the processing system may update a next request estimate for the first chunk in accordance with an average session inter-arrival time of the first video, the first index, and the chunk duration of the first video. For instance, optional step 420 may comprise performing a calculation in accordance with Equation 2 above, or Equation 2 as modified to account for relative popularities of different tracks/variants, as described above. For example, the next request estimate for the first chunk may be calculated as: a current time, plus an average session inter-arrival time for the first video, plus the first index multiplied by a chunk duration of the first video. The chunk duration may be known in advance to the processing system, and may be a characteristic of the first video and/or of the video distribution platform in general (e.g., applied to all videos or multiple videos thereof). Following step 420, the method 400 may proceed to optional step 430 or any one of the steps thereafter.

On the other hand, at step 425, the processing system may update a next request estimate for the first chunk in accordance with a difference between the first index and the second index, and further in accordance with a chunk duration of the first video. For instance, step 425 may comprise performing a calculation in accordance with Equation 1 above, or Equation 1 as modified to account for relative popularities of different tracks/variants, as described above. For instance, in one example, the first video may be an ABR video, where the first chunk is associated with a first track of a plurality of tracks of the video, and where the next request estimate for the first chunk is weighted in accordance with a ratio of a number of requests for chunks of a most popular track of the plurality of tracks to a number of requests for chunks of the first track (e.g., within a given time period, such as within the last 12 hours, the last 24 hours, the last 48 hours, etc.). In one example, the given time period over which the weighting ratio is calculated may be scaled to the overall popularity of the video across all tracks (e.g., a 12 hour window for the most popular videos, versus a 24 hour window for less popular videos, etc.).

At optional step 430, the processing system may update respective next request estimates for chunks of the first video that are stored in the cache, in response to obtaining the request for the first chunk (e.g., in addition to calculating the next request estimate for the first chunk at step 425). For instance, as described above, in one example, next request estimates for chunks of a video (e.g., all chunks of the video that are stored in the cache) may be updated upon processing of a request for any chunk belonging to the video. In one example, optional step 430 may comprise performing calculations that are the same as or similar to the updating/calculation of the next request estimate for the first chunk that is performed at step 425. It should be noted that the chunks of the first video that are stored in the cache may comprise at least a portion of the plurality of chunks that is stored in the cache.

At optional step 435, the processing system may update respective next request estimates for chunks of a least recently used video that are stored in the cache, in response to obtaining the request for the first chunk. For instance, as described above, in one example, next request estimates for chunks of a LRU video (e.g., all chunks of the LRU video that are stored in the cache) may be updated upon processing of a request for any chunk belonging to any video. In one example, step 435 may include performing calculations that are the same as or similar to the updating/calculation of the next request estimate for the first chunk of step 425, the updating/calculation of the next request estimates for the chunks of the first video of optional step 430, etc. It should be noted that the chunks of the least recently used video that are stored in the cache may comprise at least a portion of the plurality of chunks that is stored in the cache.

At optional step 440, the processing system may determine whether a new chunk is to be stored in the cache. If it is determined that a new chunk is to be stored in the cache, the method 400 may proceed to step 445. Otherwise, the method 400 may proceed to optional step 460. In one example, the determination of optional step 440 of whether a new chunk is to be stored in the cache may be in accordance with the example method 300 of FIG. 3, as described in greater detail above. In one example, optional step 440 may comprise determining that the addition of the new chunk to the cache would cause the cache to be full and/or to exceed an occupancy threshold if one or more chunks currently stored in the cache were not evicted.

At step 445, the processing system identifies at least one chunk of the plurality of chunks having a furthest next request estimate from among a plurality of next request estimates associated with the plurality of chunks that are stored in the cache. In one example, step 445 may comprise a search for a plurality of further next request estimates. For instance, to store a new chunk in the cache several stored chunks may be evicted to make room for the new chunk. For instance, if the new chunk is of a higher bitrate, the new chunk may be of a correspondingly larger size/data volume than several chunks having the further next request estimates that are of lower bitrates (and hence, in one example, of lesser size/data volume).

In one example, the processing system may maintain the plurality of next request estimates associated with the plurality of chunks stored in the cache as nodes in a max-heap, e.g., as described above. In such an example, step 445 may comprise a search via the global max-heap for the further next request estimate(s). For instance, the max-heap may comprise a hierarchy of local max-heaps and a global heap, where each of the local max-heaps is associated with a respective video of the plurality of videos having chunks stored in the cache. In one example, each of the local max-heaps comprises nodes for chunks of a respective video that are sorted according to next request estimates for the chunks of the respective video. In addition, in one example the max-heap identifies each of the plurality of chunks that is stored in the cache by a respective index within a respective video to which each of the plurality of chunks belongs. In an example, where there are multiple bitrates/tracks/variants of the video, each chunk may be identified by track-plus-index, or another identifier which maps to the track-plus-index. In one example, there is no need to further identify the video to which each chunk belongs, since each chunk is in a local max-heap that is dedicated to the video to which the chunk belongs. Other chunks from other videos may have next request estimates organized in a different local max-heap.

At step 450, the processing system may evict the at least one chunk from the cache in accordance with the identifying (e.g., in response to determining that the new chunk is to be stored in the cache and having identified the chunk(s) with the furthest next request estimate(s)).

At optional step 455, the processing system may store the new chunk in the cache. Following optional step 455, the method 400 may proceed to optional step 460.

At optional step 460, the processing system may determine if there are more chunk requests to process. If there are no more chunk requests to process, the method 400 may proceed to step 495. Otherwise, if there are more chunk requests to process, the method 400 may return to step 410 to process one or more additional chunks. For instance, with respect to an additional iteration of the method 400, the processing system may obtain a third request for a third chunk of a second video of the plurality of videos, wherein the third chunk is associated with a third index of the second video, wherein the third chunk comprises one of the plurality of chunks that is stored in the cache (e.g., at step 410). It should again be noted that as discussed above, the terms "first," "second," "third," etc. are intended as labels only to distinguish from others of the same type of item (e.g., different chunks, different videos, etc.). In addition, in an additional iteration of the method 400, the processing system may determine that no respective chunks of the second video that are last requested via a plurality of sessions has an index that is prior to the third index in a temporal sequence of indices of the second video (e.g., at step 415), may update a next request estimate for the third chunk in accordance with an average session inter-arrival time of the second video, the third index, and the chunk duration of the second video (e.g., at optional step 420), and so on. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as for additional time intervals and/or chunks of the first video or for a different video, and so forth. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIG. 3 or FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 or method 400 may comprise optional steps, or can be combined, separated, and/or performed in a different order from that described above, without departing from the example embodiments of the present disclosure. The method 300 or the method 400 may also be expanded to include additional steps. Thus, these and other modifications are all contemplated within the scope of the present disclosure.

FIG. 5 depicts a high-level block diagram of a computing system 500 (e.g., a computing device or processing system) specifically programmed to perform the functions described herein. For example, any one or more components or devices illustrated in FIG. 1 or described in connection with the method 300 of FIG. 3 or the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for making a cache admission decision regarding a video chunk and/or for making a cache eviction determination regarding video chunks in a cache, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for making a cache admission decision regarding a video chunk and/or for making a cache eviction determination regarding video chunks in a cache (e.g., a software program comprising computer-executable instructions) can be loaded into memory 504 and executed by hardware processor element 502 to implement the steps, functions or operations as discussed above in connection with the example method 300 or method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for making a cache admission decision regarding a video chunk and/or for making a cache eviction determination regarding video chunks in a cache (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system including at least one processor, a request for a first chunk of a first video;
determining, by the processing system, that the first chunk is not stored in a cache;
applying, by the processing system in response to the determining that the first chunk is not stored in the cache, a machine learning classifier to predict whether the first chunk will be re-requested within a time horizon, wherein the machine learning classifier is trained in accordance with a set of features associated with a plurality of chunks of a plurality of videos;
storing, by the processing system, the first chunk in the cache, when it is predicted via the machine learning classifier that the first chunk will be re-requested within the time horizon; and
evicting, by the processing system, at least a second chunk from the cache in accordance with an eviction process, wherein the eviction process includes:
identifying the second chunk as having a longest next request estimate as compared to next request estimates of a plurality of chunks in the cache, wherein for a given chunk of the plurality of chunks in the cache, the eviction process weights a next request estimate for the given chunk in accordance with a relative popularity of a track of the given chunk as compared to other tracks for a same video to which the given chunk belongs; and
 evicting the second chunk from the cache when it is determined that the second chunk has the longest next request estimate.

2. The method of claim 1, wherein the time horizon is based upon a size of the cache.

3. The method of claim 2, wherein the time horizon comprises an estimate of a time to replace contents of the cache at a full capacity in accordance with a first-in-first-out policy.

4. The method of claim 1, wherein the set of features comprises:
 a chunk size;
 a chunk index; and
 a chunk bitrate.

5. The method of claim 4, wherein the set of features further comprises:
 a number of sessions for streaming the first video;
 an average number of sessions for streaming the first video within a given time period;
 a session inter-arrival time for the first video; and
 a time since a start of a last session for streaming the first video.

6. The method of claim 5, wherein the set of features further comprises:
 a time of day; and
 a day of week.

7. The method of claim 1, wherein the machine learning classifier outputs a probability estimate for a future request for the first chunk within the time horizon, wherein the first chunk is stored in the cache when it is predicted via the machine learning classifier that the first chunk will be re-requested within the time horizon and when the probability estimate complies with a threshold.

8. The method of claim 1, further comprising:
 obtaining a request for a third chunk of the first video or of a second video;
 determining that the third chunk is not stored in the cache;
 applying, in response to the determining that the third chunk is not stored in the cache, the machine learning classifier to predict whether the third chunk will be re-requested within the time horizon; and
 declining to store the third chunk in the cache, when it is predicted via the machine learning classifier that the third chunk will not be re-requested within the time horizon.

9. The method of claim 1, further comprising:
 determining, in response to selecting to store the first chunk in the cache, whether a storage of the first chunk in the cache will cause the cache to exceed an occupancy threshold, wherein the evicting the at least the second chunk is performed in response to determining that the storage of the first chunk in the cache will cause the cache to exceed the occupancy threshold.

10. The method of claim 1, further comprising:
 obtaining a request for a third chunk of a second video;
 determining that the third chunk is not stored in the cache;
 determining that a session inter-arrival time of the second video exceeds a threshold; and
 determining to not store the third chunk in the cache, in response to the determining that the session inter-arrival time of the second video exceeds the threshold.

11. A non-transitory computer-readable medium storing instructions which, when executed by a processing system including at least one processor, cause the processing system to perform operations, the operations comprising:
 obtaining a request for a first chunk of a first video;
 determining that the first chunk is not stored in a cache;
 applying, in response to the determining that the first chunk is not stored in the cache, a machine learning classifier to predict whether the first chunk will be re-requested within a time horizon, wherein the machine learning classifier is trained in accordance with a set of features associated with a plurality of chunks of a plurality of videos;
 storing the first chunk in the cache, when it is predicted via the machine learning classifier that the first chunk will be re-requested within the time horizon; and
 evicting at least a second chunk from the cache in accordance with an eviction process, wherein the eviction process includes:
  identifying the second chunk as having a longest next request estimate as compared to next request estimates of a plurality of chunks in the cache, wherein for a given chunk of the plurality of chunks in the cache, the eviction process weights a next request estimate for the given chunk in accordance with a relative popularity of a track of the given chunk as compared to other tracks for a same video to which the given chunk belongs; and
  evicting the second chunk from the cache when it is determined that the second chunk has the longest next request estimate.

12. The non-transitory computer-readable medium of claim 11, wherein the time horizon is based upon a size of the cache.

13. The non-transitory computer-readable medium of claim 12, wherein the time horizon comprises an estimate of a time to replace contents of the cache at a full capacity in accordance with a first-in-first-out policy.

14. The non-transitory computer-readable medium of claim 11, wherein the set of features comprises:
 a chunk size;
 a chunk index; and
 a chunk bitrate.

15. The non-transitory computer-readable medium of claim 14, wherein the set of features further comprises:
 a number of sessions for streaming the first video;
 an average number of sessions for streaming the first video within a given time period;
 a session inter-arrival time for the first video; and
 a time since a start of a last session for streaming the first video.

16. The non-transitory computer-readable medium of claim 15, wherein the set of features further comprises:
 a time of day; and
 a day of week.

17. The non-transitory computer-readable medium of claim 11, wherein the machine learning classifier outputs a probability estimate for a future request for the first chunk within the time horizon, wherein the first chunk is stored in the cache when it is predicted via the machine learning classifier that the first chunk will be re-requested within the time horizon and when the probability estimate complies with a threshold.

18. The non-transitory computer-readable medium of claim 11, wherein the operations further comprise:
 obtaining a request for a third chunk of the first video or of a second video;

determining that the third chunk is not stored in the cache;
applying, in response to the determining that the third chunk is not stored in the cache, the machine learning classifier to predict whether the third chunk will be re-requested within the time horizon; and
declining to store the third chunk in the cache, when it is predicted via the machine learning classifier that the third chunk will not be re-requested within the time horizon.

19. An apparatus comprising:
a processing system including at least one processor; and
a computer-readable medium storing instructions which, when executed by the processing system, cause the processing system to perform operations, the operations comprising:
  obtaining a request for a first chunk of a first video;
  determining that the first chunk is not stored in a cache;
  applying, in response to the determining that the first chunk is not stored in the cache, a machine learning classifier to predict whether the first chunk will be re-requested within a time horizon, wherein the machine learning classifier is trained in accordance with a set of features associated with a plurality of chunks of a plurality of videos;
  storing the first chunk in the cache, when it is predicted via the machine learning classifier that the first chunk will be re-requested within the time horizon; and
  evicting at least a second chunk from the cache in accordance with an eviction process, wherein the eviction process includes:
    identifying the second chunk as having a longest next request estimate as compared to next request estimates of a plurality of chunks in the cache, wherein for a given chunk of the plurality of chunks in the cache, the eviction process weights a next request estimate for the given chunk in accordance with a relative popularity of a track of the given chunk as compared to other tracks for a same video to which the given chunk belongs; and
    evicting the second chunk from the cache when it is determined that the second chunk has the longest next request estimate.

20. The apparatus of claim 19, wherein the time horizon is based upon a size of the cache.

* * * * *